Jan. 9, 1934.   C. D. GALLOWAY   1,942,641
STORAGE BATTERY FILLING MACHINE
Filed March 11, 1931   6 Sheets-Sheet 1
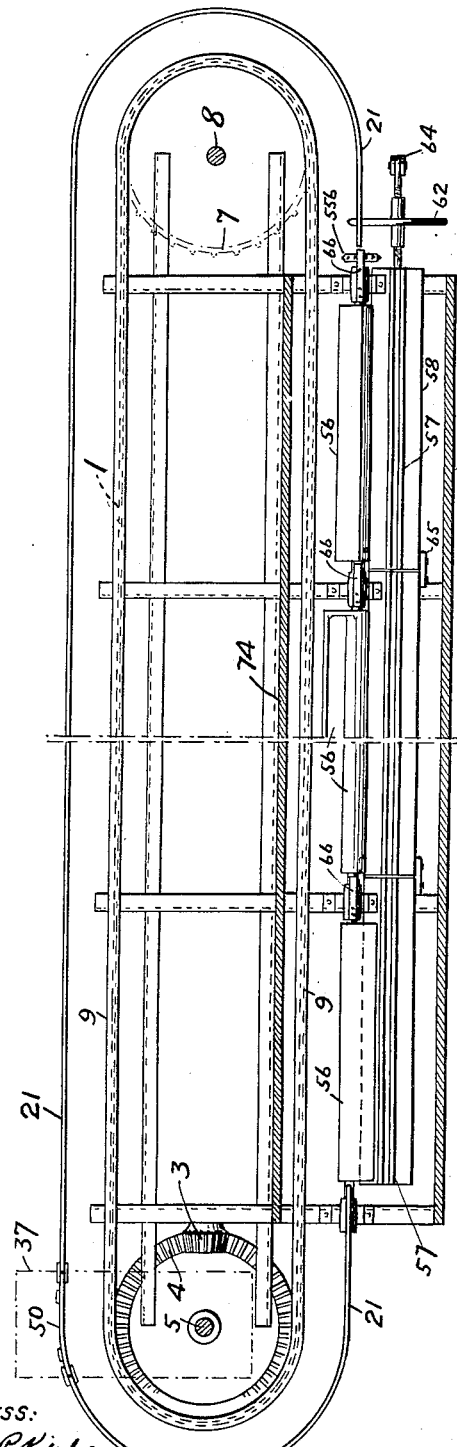
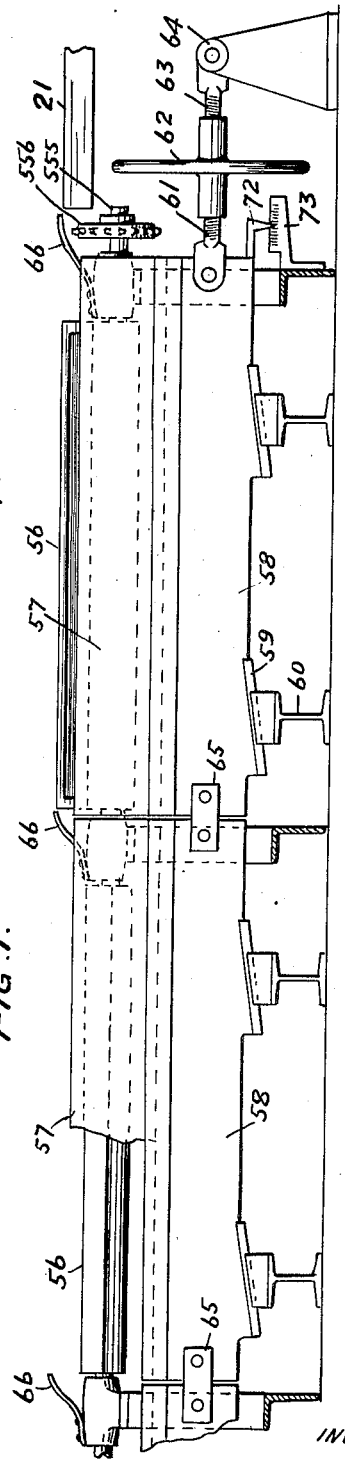
INVENTOR
Charles D. Galloway
BY
Augustus B. Stoughton
ATTORNEY.

Jan. 9, 1934.  C. D. GALLOWAY  1,942,641
STORAGE BATTERY FILLING MACHINE
Filed March 11, 1931      6 Sheets-Sheet 3

WITNESS:   INVENTOR
Charles D. Galloway
BY
Augustus B. Stoughton
ATTORNEY.

Jan. 9, 1934.  C. D. GALLOWAY  1,942,641
STORAGE BATTERY FILLING MACHINE
Filed March 11, 1931  6 Sheets-Sheet 4
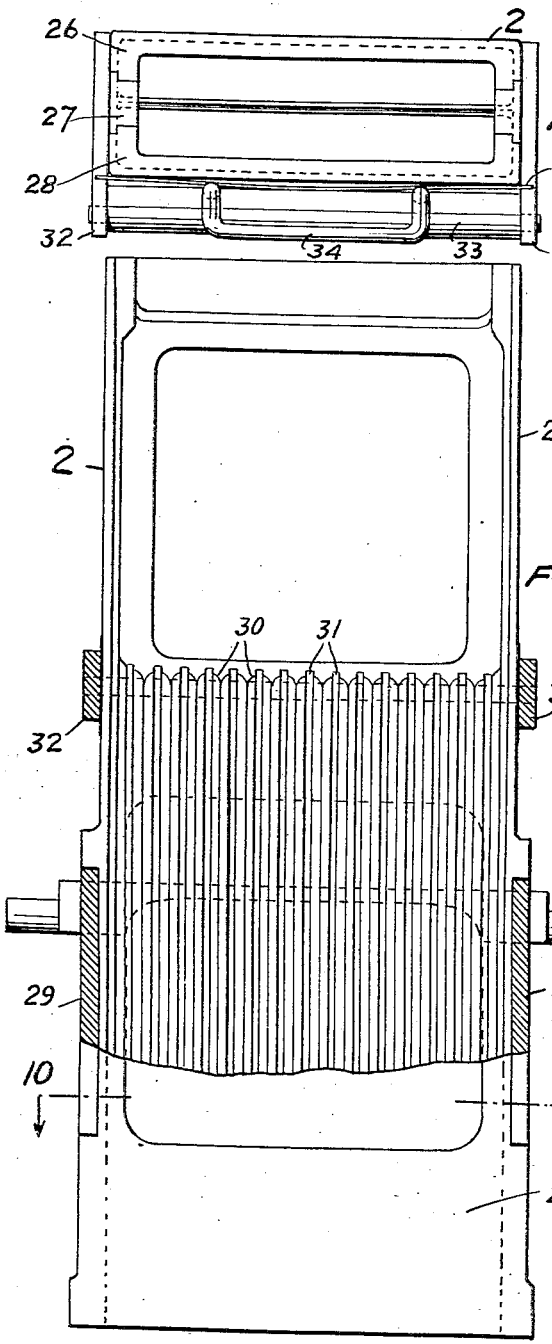
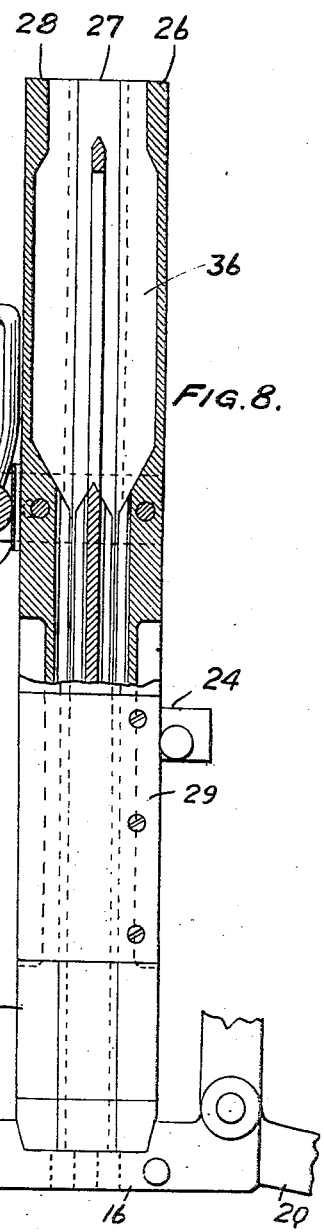
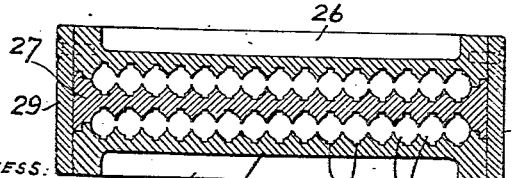

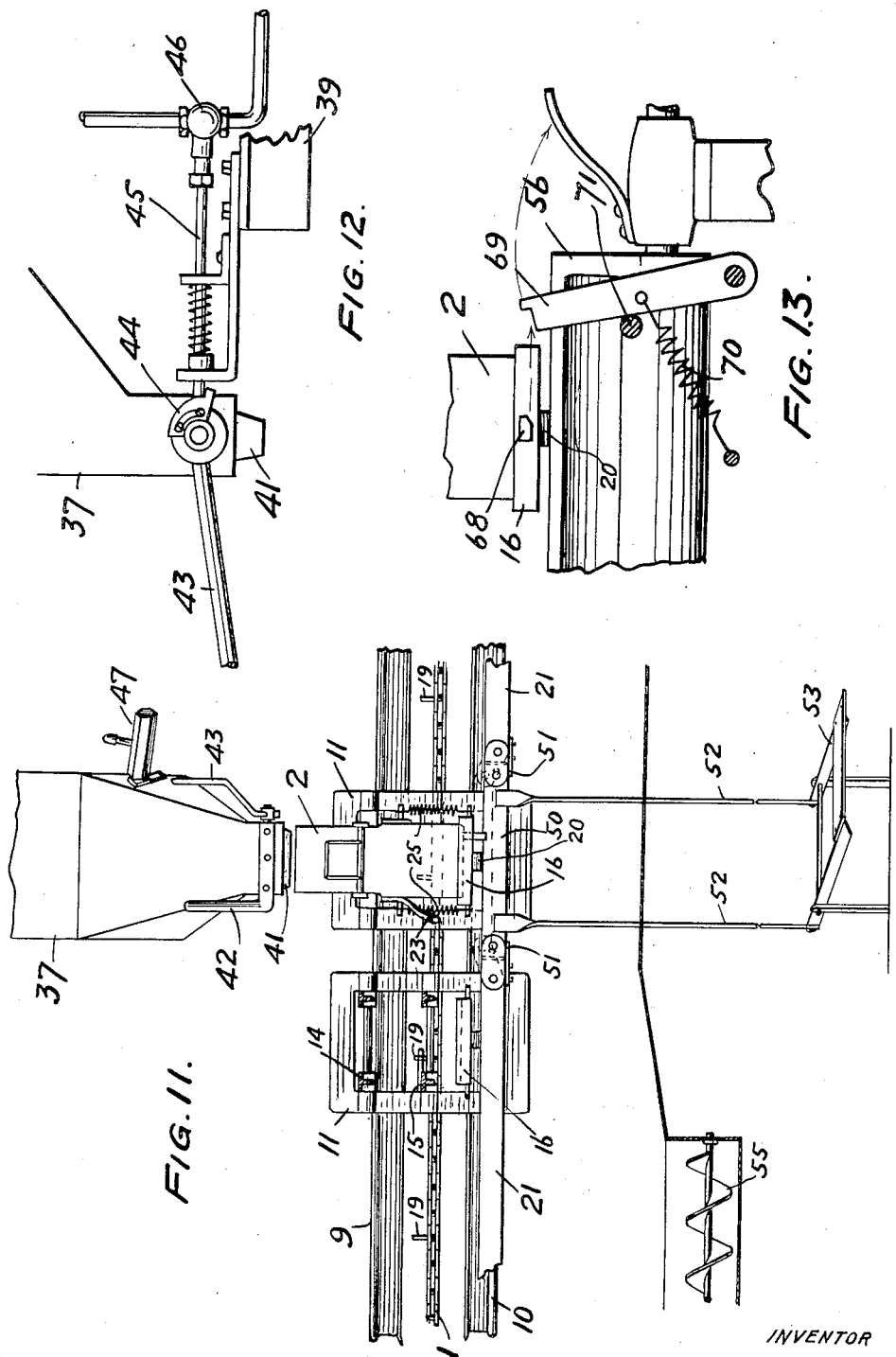

Jan. 9, 1934.   C. D. GALLOWAY   1,942,641
STORAGE BATTERY FILLING MACHINE
Filed March 11, 1931   6 Sheets-Sheet 6
FIG. 14.
FIG. 15.
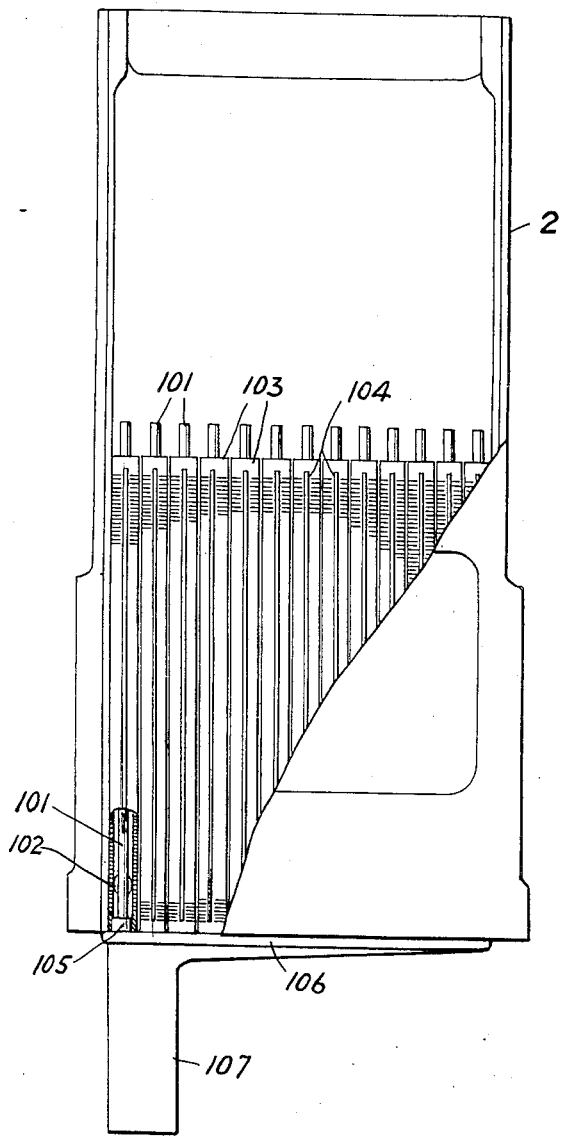
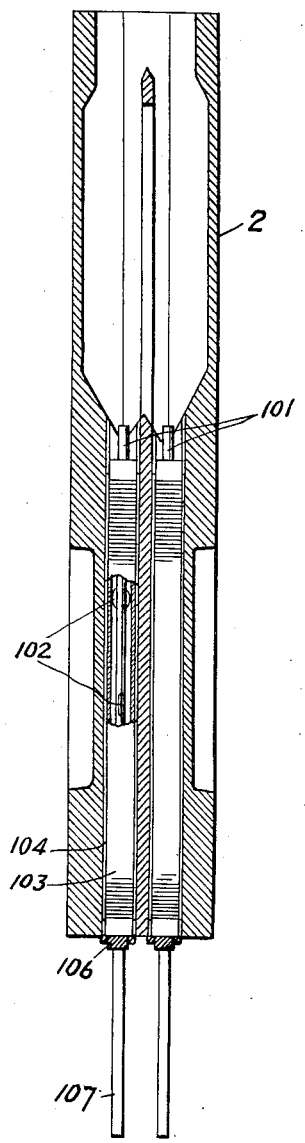
WITNESS:
INVENTOR
Charles D. Galloway
BY
Augustus B Stoughton
ATTORNEY.

Patented Jan. 9, 1934

1,942,641

UNITED STATES PATENT OFFICE 1,942,641

STORAGE BATTERY FILLING MACHINE

Charles D. Galloway, Philadelphia, Pa., assignor to The Electric Storage Battery Company, Philadelphia, Pa., a corporation of New Jersey Application March 11, 1931. Serial No. 521,710

12 Claims. (Cl. 226—1)

The object of my invention is to provide a machine for filling storage battery plates with the lead oxides which form the active material, especially those plates composed of tubular elements surrounding the active material and a metallic spine.

I provide a jig or casing adapted to contain one or more plates which are to be filled. The jig has a space or hopper above the plates to receive the active material. The jigs are mounted on a movable conveyor and are carried beneath a bin from whence lead oxides are poured into the jig hopper. The jigs are then conveyed over moving cams which lift them and drop them onto anvils whereby the plates are jarred so that the lead oxides are shaken down and uniformly distributed throughout the tubular elements which form the casings of the plates.

The advantages of the above described machine are as follows:

Each jig with the contained plates and active material is raised gradually by the cam and allowed to drop by gravity through a predetermined height thus developing a momentum on striking the anvil which is uniform for all parts of all the jigs, plates and active material for any given adjustment.

By adjusting the speed of the conveyor chain and the speed of revolution of the cams, the number of blows delivered to each jig can be varied and by adjusting the height of the anvils the intensity of each blow may be varied. Having once made these adjustments to obtain the desired results, the conditions may be kept constant for all the plates passing through the machine.

For a further exposition of my invention reference may be had to the annexed drawings and specification at the end whereof my invention will be specifically pointed out and claimed.

In the drawings,

Figure 1 is a plan view of my device with the bin and upper parts of the device broken away and with the jigs omitted from the conveyor.

Figure 2 is a side elevation of my device looking at the anvils on an enlarged scale from Figure 1.

Figure 7 is a side elevation of a jig with parts broken away.

Figure 8 is an end view in elevation of a jig with parts broken away.

Figure 9 is a plan view of a jig.

Figure 10 is a vertical cross section through a jig showing the portion adapted to receive the plates.

Figure 11 is a side elevation showing the bin and jig lifting mechanism.

Figure 12 is a detail view showing the valve for the bin and the vibrator control mechanism.

Figure 13 is a detailed view in side elevation showing an auxiliary means for lifting the jigs onto the stationary cams.

Figure 14 is a side elevation with parts broken away showing a jig and a plate therein, and Figure 15 is a vertical cross section at right angles to Figure 14.

Figure 3:
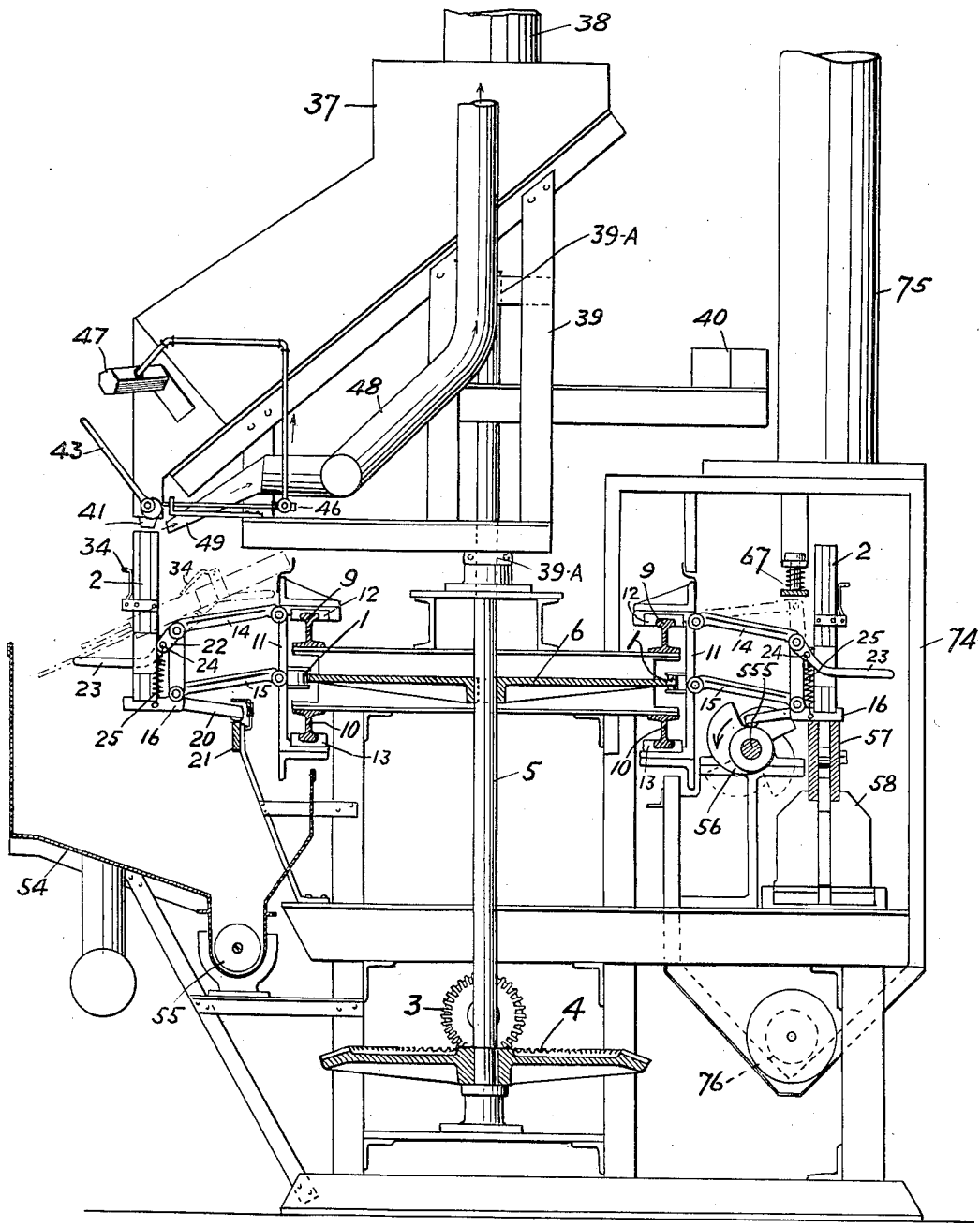
Figure 3 is an end view of the driven end of my device.
Figure 6:
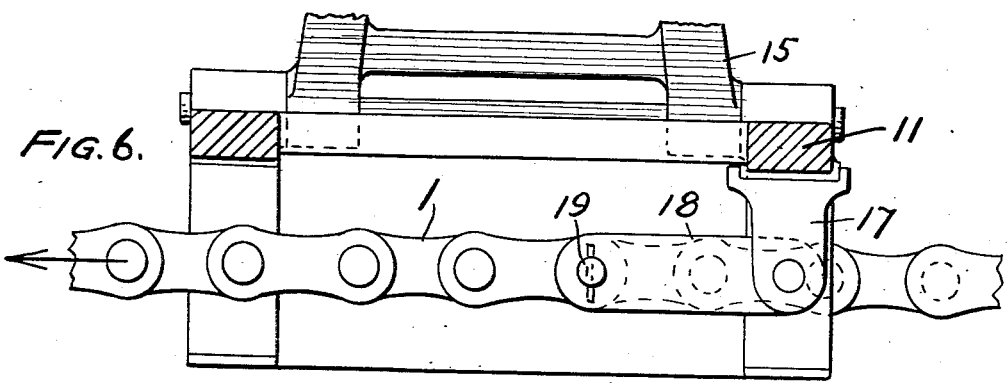
Figure 6 is a plan view of Figure 5.

In the embodiment of my invention, chosen for illustration in the drawings, my device is shown consisting especially of a conveyor shown as a chain 1 mounted so as to move in a continuous path and to carry thereon jigs generally indicated at 2 which are adapted to receive one or more storage battery plates. As is best seen in Figures 14 and 15, these plates may be of the type commercially known as "Iron-clad". These plates consist of a number of metallic spines 101 which have a plurality of projections 102 extending therefrom in angularly disposed directions. Surrounding each spine 101 is a tube 103 conveniently made of slotted rubber having a pair of shoulders 104 on its outer surface. The upper ends of these tubes 103 (which are shown in inverted position) are closed by projections 105 on top bar 106 which also has lug 107 thereon. These plates are placed in the jigs, the hoppers of which are then filled with the lead oxides from which the active material of the finished plate is formed. The jigs are then subjected to a jarring operation in which the lead oxides are shaking down and uniformly distributed throughout the plates. The jigs are then opened and the plates removed and fresh plates inserted.

For the performance of the above cycle of operations, chain-conveyor 1 is mounted so as to be moved in a continuous path. Conveyor 1 is driven through the gears 3 and 4 and shaft 5 by a motor or other source of power (not shown), whose speed may be adjusted. Shaft 5 carries thereon a sprocket 6 which meshes with conveyor chain 1 and thereby drives the conveyor. At its opposite end conveyor chain 1 passes over sprocket 7 which is mounted on shaft 8. Shaft 8 is mounted so as to be adjustable relative to shaft 5 and to thereby take up any slack in conveyor chain 1. Mounted adjacent conveyor chain 1 are upper and lower guide rails 9 and 10 respectively. Rails 9 and 10 are adapted to receive carriage 11 thereon.

Figures 4, 5:
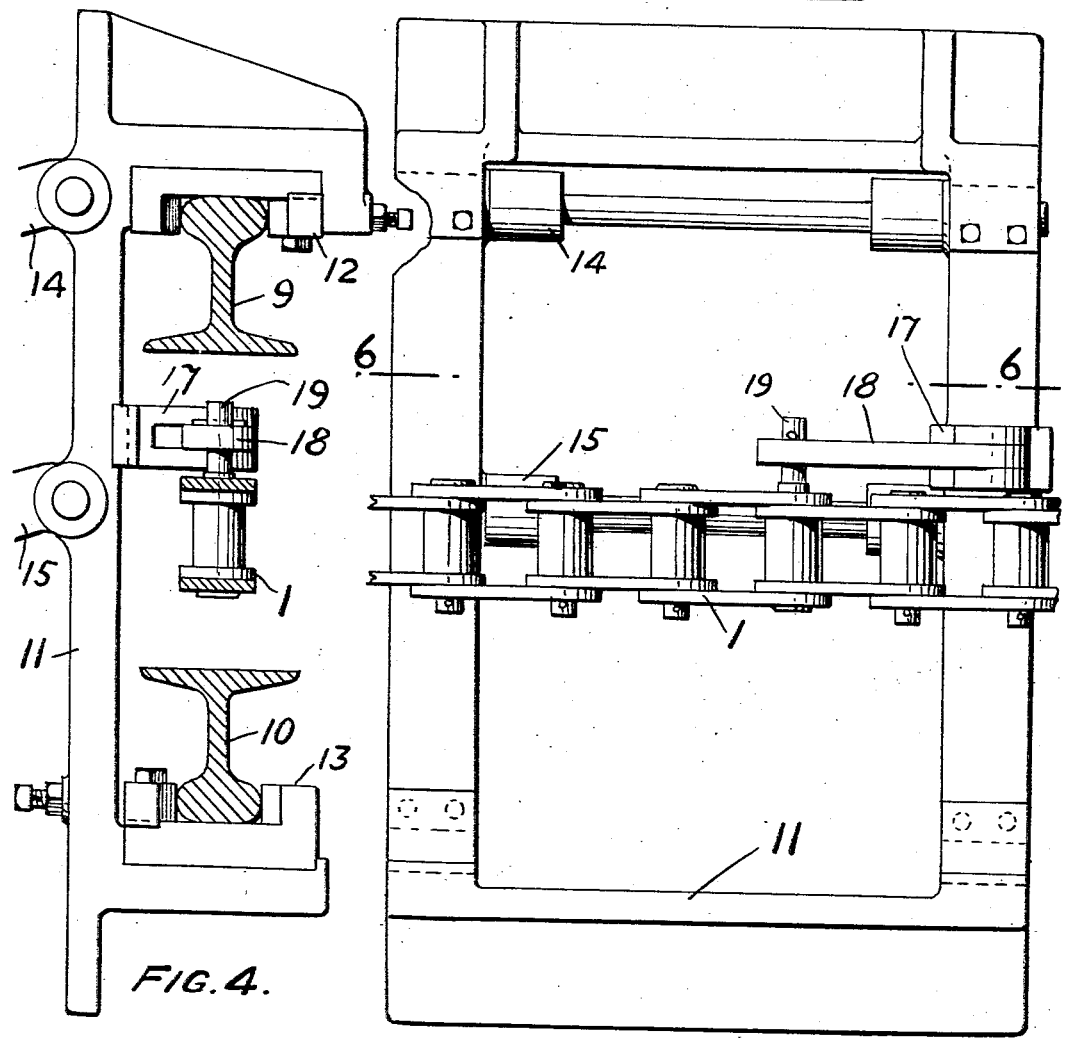
Figure 4 is a cross section through the rails and conveyor and jig carrying mechanism.
Figure 5 is a side elevation of Figure 4 with the rails omitted.

Carriages 11 have adjustable bearings 12 and 13 shown in detail in Fig. 4, which interfit with guide rails 9 and 10 respectively. Carriages 11 have on their outer surfaces arms 14 and 15 which are pivotally connected thereto and which are pivotally connected at their outer ends to jig support 16. It will thus be seen that the jig, generally indicated at 2, is capable of vertical movement relative to carriage 11. Carriages 11 carry on their inner surfaces clevices 17 which carry pivotally mounted links 18 through which may be projected pins 19 which connect the carriages 11 to the chain 1 so that the carriages 11 are pulled by the conveyor chain 1 along the rails 9 and 10. Jig supports 16 have at their rear or inner end arms 20 which are adapted to cooperate with rails 21 which are mounted adjacent and parallel to upper and lower rails 9 and 10, and also to cooperate with cams 56.

Jig supports 16 carry at their upper ends pivotally mounted links 22, one of which has its outer end elongated into a handle 23 as best seen in Figure 3. Jigs 2 are pivotally mounted in links 22 by means of shaft 24, as best seen in Figure 7. Links 22 have connected at the outer ends thereof springs 25 which are connected at their opposite ends to jig support 16 and which, therefore, serve to stress and clamp jigs 2 against support 16 when the jigs are in upright position.

The jigs which are generally indicated at 2 consist of three plates 26, 27 and 28 respectively and are shown in detail in Figs. 7, 8, 9 and 10. The inner or rear member 26 carries on its inner or rear face a shaft 24 whereby the jigs are supported and also has attached thereto in any convenient manner the guide plates 29 which guide parts 27 and 28 by notches therein. Plates 26, 27 and 28 each have opposite grooves 30 therein, the grooves 30 having depressions 31. The grooves and depressions cooperate together to define chambers of the proper size and shape to receive the tubular elements of the storage battery plates between them and to hold them in proper position for the filling operation. Inner plate 26 also carries side bars 32 at the outer ends of which is mounted eccentric 33 which has a handle 34 and which by moving from the position in which it is shown in Figure 8 to the opposite position in contact with the face of plate 28, serve to loosen the plates 26, 27 and 28 sufficiently to permit the insertion or removal of the battery plates. Eccentric 33 operates on bearing plate 35. Plates 26, 27 and 28 define at their upper end a cavity or hopper generally indicated in Figure 8 as 36 into which a suitable amount of lead oxide for filling the plates is supplied from the bin 37.

As is best seen in Figures 3 and 11, there is mounted at the driving end of the machine and revolvable about the axis of shaft 5, a bin 37 which has a feed pipe 38 leading thereto in axial alinement with shaft 5. This feed pipe provides a convenient means for feeding the lead oxide into the bin 37. Bin 37 is rotatably supported on shaft 5 by means of suitable brackets 39 and bearings 39A which also carry a counterweight 40 which counterbalances the weight of the eccentric parts and load of bin 37. At its lower end bin 37 carries a filling nozzle 41 which is tapered suitably to fit into the top of jigs 2. Fastened at the lower end of bin 37 is a handle 42 which serves to move bin 37 about its pivot on shaft 5 and to thereby hold nozzle 41 in contact with a jig 2 as the latter is moved along by conveyor chain 1 so that the jig may be filled while in motion. The flow of lead oxides through nozzle 41 is controlled by a valve (not shown) which is located within the bin 37 just above nozzle 41 and which is adapted to be actuated by valve handle 43.

Referring to Figure 12, it will be seen that valve handle 43 carries at its rear an adjustable eccentric 44 which operates on rod 45 to actuate the air valve 46 which is in turn connected to vibrator 47, as is best seen in Figure 3. This vibrator, attached to bin 37, serves to accelerate the flow of oxides through nozzle 41 whenever the valve above the nozzle is opened. There is also mounted on brackets 39 adjacent bin 37 exhaust pipe 48 having a nozzle 49 adjacent nozzle 41 to protect the operator from lead oxide dust.

Referring especially to Figure 11, it will be seen that rail 21 has a movable section 50 pivotally connected thereto by links 51. Links 52 serve to connect movable rail section 50 with treadle 53, whereby the movable rail section 50 may be lifted by the operator, carrying with it jig support 16, by means of arm 20, and consequently the jig 2 carried by the jig support. This brings the upper opening of jig 2 into cooperation with nozzle 41 of bin 37, for the transfer of oxide from the bin to the hopper of jig 2, while the latter is in motion. The weight of the jig and the supported parts return the rail section 50 to lower position when the operator releases the pressure on treadle 53. Beneath bin 37 there is mounted a casing 54 having in one portion a screw conveyor 55 for the purpose of removing the excess lead oxide which falls into the casing.

On the opposite side of the machine from movable rail section 50 the rail 21 is broken and in alinement therewith there are located a plurality of cams 56 which cooperate with arms 20 to lift jig supports 16 and the jigs 2 supported thereby. Cams 56 are mounted on shaft 555 and are adapted to be driven from sprocket 556 from any convenient source of power whose speed is preferably adjustable. The cams are spaced at intervals along the shaft and angularly displaced about the shaft so that all the work is not required of the shaft at one time. As is best seen in Figure 3, the rear face of cams 56 is almost radial so that the arm 20 and the parts carried thereby are suddenly allowed to drop. This permits jig support 16 and jigs 2 to fall into contact with anvils 57 which arrest the fall with a severe shock. Anvils 57 are mounted on anvil blocks 58 which have at their lower portions longitudinal wedges 59 which are carried on wedge supports 60. This structure is best seen in Figure 2. At one end the anvil blocks 58 are connected to screw 61 which in turn connects to hand wheel 62 and screw 63 to anchor 64. The threads of screws 61 and 63 are right and left hand respectively. Movement of hand wheel 62 causes movement of anvil blocks 58 relative to anchor 64 and consequent raising or lowering of the height of the anvils due to the interaction of wedges 59 on wedge supports 60. Anvil blocks 58 are connected together by pivotal links 65. The relative movement of anvil blocks 58 is indicated by pointer 72 which cooperates with stationary scale 73 which therefore indicates the magnitude of the drop of the jig carrier for any given adjustment.

Adjacent the discharge end of each of the cams 56 there is mounted a stationary cam 66 longitudinally aligned with rail 21. The engagement of arm 20 with the stationary cams 66 serves to place the arm 20 above the following cam no matter whether the latter is in raised or lowered position. This prevents engagement between the arm 20 and the side of cams 56. As shown in Figure 3 there are provided buffers 67 above the jig supports 16 which prevent the jigs 2 being thrown to too high a position when first coming in contact with the cam.

Figure 13 shows additional mechanism which at the discharge end of the cam serves to lift arm 20 out of contact with the cam before reaching the discharge end. This consists in providing on jig carriers 16 a projection 68 so located as to be engaged by lever 69 located adjacent the discharge end of cam 56 and of sufficient length to lift the jig carrier 16 off the cam 56 and to deposit it on the stationary cam 66 or rail 21. The continued forward motion of jig support 16 then disengages the lever 69 from the projection 68 and lever 69 under the pull of spring 70 returns to its normal position against stop 71. The cams 56 are surrounded by a casing generally indicated at 74 which has exhaust pipe 75 attached thereto and which may have a screw conveyor 76 located in the lower part thereof for the removal of lead oxides.

The operation of my device is as follows: Handle 23 is grasped and raised and the jigs are thrown by one operator into the dotted line position of Figure 3. In this position eccentric 34 is actuated so that the jigs are loosened, the previously filled plates may be removed, and fresh plates to be filled inserted. Eccentric 34 is then thrown to closed position and the jig 2 returned to its seat on jig carrier 16 by handle 23 under the actuation of spring 25. During the time of this operation conveyor 1 has moved carriage 11 by means of pin 19, link 18, and clevis 17, and the jig 2 supported on the jig support and carriage, into position adjacent bin 37. A second operator then grasps handle 42 and moves bin 37 so that nozzle 41 is located over jig 2, at the same time pressing treadle 53 to raise the jig 2 into contact with nozzle 41. Handle 43 is then operated to permit the flow of lead oxide from bin 37 into jig 2 and, at the same time, cause the actuation of vibrator 47. Bin 37 is moved by handle 42 keeping nozzle 41 over jig 2 during the filling operation. During the filling operation treadle 53 is kept depressed so that movable rail section 50, arm 20, jig support 16 and jig 2 are lifted so that jig 2 is centered on nozzle 41. Any dust escaping during the filling operation from nozzle 41 is removed through nozzle 49 and exhaust pipe 48. Because bin 37 is pivoted concentric with the curve of the conveyor 1 nozzle 41 and jig 2 move in the same path and may be conveniently held together. Conveyor chain 1 carries jigs 2 further until rail 21 is interrupted and arm 20 engages with the first of the cams 56. Cam 56 serves to lift arm 20, jig support 16 and jig 2. From the lifted position, cam 56 permits jig 2 to fall so that jig support 16 strikes anvil 57 a sharp blow. This operation is repeated, the jig at the same time being horizontally moved by the conveyor 1 and by the continued repetition of these blows the lead oxide within the jig 2 is uniformly packed and distributed throughout the plates contained in the jig. When the jig 2 reaches the end of one cam 56, arm 20 engages stationary cam 66 and lifts jig 2 onto the next cam 56. This operation may be supplemented by lever 69 as explained above. The last cam 56 has adjacent its end a stationary cam 66 which returns arm 20 and the jig 2 supported thereby to rail 21 on which the jig is supported while the conveyor 21 moves it to a position where the jig may be opened, the filled plates removed and new plates inserted.

I do not intend to be limited in the practice of my invention save as the scope of the prior art and of the attached claims may require.

1. A plate filling machine including a jig enclosing the plates to be filled, means for lifting said jig and causing it to drop, and an independently mounted, non-resilient anvil for arresting the drop of said jig suddenly.

2. A plate filling machine including a conveyor, a plurality of jigs moved horizontally by said conveyor, a plurality of cams for lifting said jigs and causing them to drop, and independently mounted, non-resilient anvils for suddenly arresting the drop of said jigs.

3. A plate filling machine including a conveyor, a plurality of jig carriages moved horizontally by said conveyor, a plurality of jigs mounted on said carriages for vertical movement parallel thereto, a plurality of cams for lifting said jigs and causing them to drop, a plurality of independently mounted, non-resilient anvils for suddenly arresting the drop of said jigs, and means for adjusting the vertical height of said anvils.

4. A plate filling machine including a conveyor, a plurality of jigs moved horizontally by said conveyor, a plurality of cams for lifting said jigs and causing them to drop, stationary cams between successive movable cams for lifting said jigs onto said movable cams, and an anvil for suddenly arresting the drop of the jigs.

5. A jig for a plate filling machine including a jig support, links pivotally mounted on said support, a handle on one of said links, a plate pivotally mounted on said links, plates cooperating with said last mentioned plate to form a jig, and means for fastening said plates together.

6. A jig for a plate filling machine including a jig carriage, arms pivotally mounted on said jig carriage, a jig support pivotally mounted on said arms, an arm rearwardly projecting from said jig support, a rail on which said last mentioned arm rests forming a support for said jig, links pivotally mounted on said jig support, a handle on one of said links, a hollow jig pivotally mounted on said links, and springs connected to said links and to said jig support.

7. A plate filling machine including a conveyor adapted to move in a closed path, a plurality of jigs adapted to be moved by said conveyor in a closed path and a bin having a nozzle mounted for movement along part of the closed path of said jigs in the same path as and adjacent to said jigs.

8. A plate filling machine including a conveyor mounted for movement in a closed path, a plurlaity of jigs mounted so as to be moved by said conveyor in a closed path, a bin having a nozzle mounted for movement over a portion of the closed path adjacent said jigs, and means for lifting said jigs in succession into contact with said nozzle during its movement adjacent to said jigs.

9. A plate filling machine including a conveyor mounted for movement in a closed path, a plurality of jigs moved by said conveyor in a closed path, a bin having a nozzle adapted to move over a portion of said closed path adjacent said jigs, a valve controlling the flow of material through said nozzle, a vibrator for jarring material in said bin, and means for simultaneously controlling the operation of said valve and said vibrator.

10. A plate filling machine including a conveyor, a plurality of jigs moved by said conveyor, a bin having a nozzle movable over a portion of the path of said jigs to fill said jigs with material, a cam beyond said bin in the path of movement of said jigs for lifting said jigs and causing them to drop, and an anvil for suddenly arresting the drop of said jigs.

11. A plate filling machine including a conveyor mounted for movement in a closed path, a portion of which path is a circular arc, a plurality of plate filling jigs carried by said conveyor, a bin mounted to revolve on an axis concentric with said arc, said bin having a nozzle adapted to move over the circular portion of said path in proximity with said jigs for delivering powdered material to the jigs while in motion.

12. A plate filling machine including a conveyor mounted for movement in a closed path, a plurality of plate filling jig supports mounted on said conveyor for limited vertical motion, a series of cams arranged to revolve at a predetermined and adjustable speed about an axis parallel to a portion of said conveyor path and adapted to lift said supports comparatively slowly and allow them to drop suddenly by gravity, anvils upon which the jig supports impinge when dropped, and means for adjusting the position of the anvils relative to the cams.

CHARLES D. GALLOWAY.